Oct. 19, 1954     J. JACKSON     2,691,926
COTTON CHOPPER

Filed March 12, 1951     3 Sheets-Sheet 1

Jasper Jackson
INVENTOR.

BY

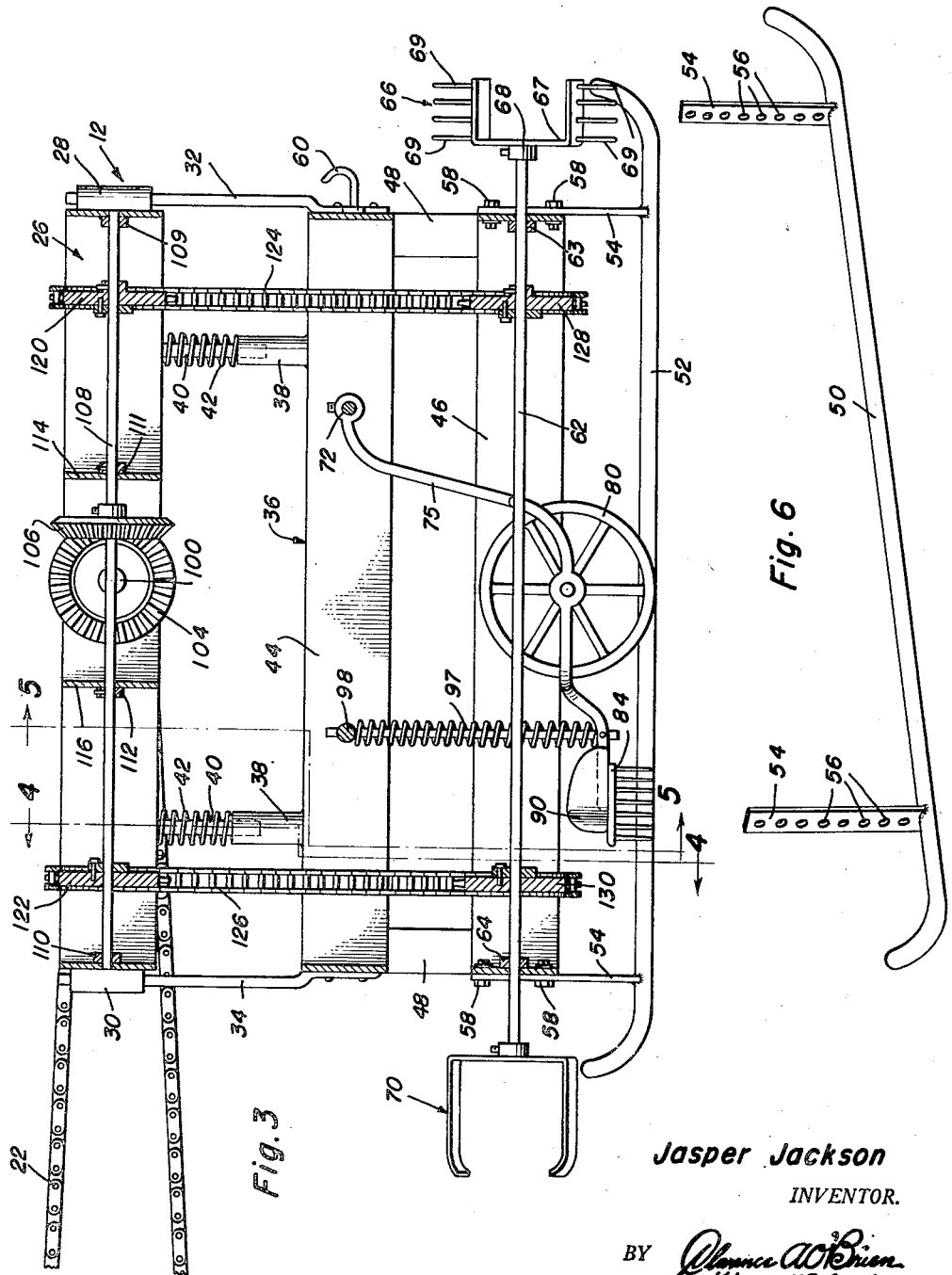

Oct. 19, 1954          J. JACKSON            2,691,926
                       COTTON CHOPPER
Filed March 12, 1951                      3 Sheets-Sheet 3
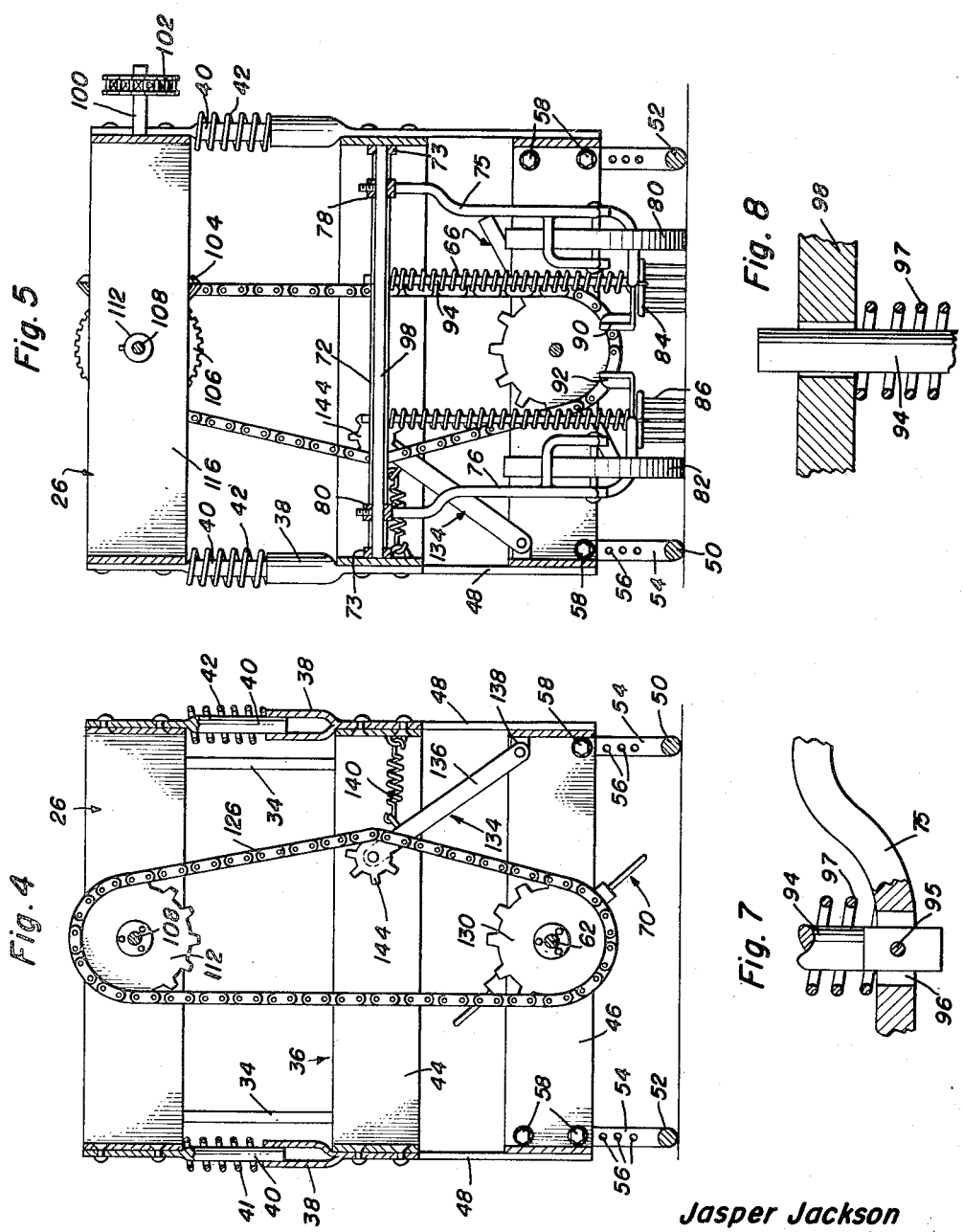
Jasper Jackson
     INVENTOR.
BY *Clarence A. O'Brien
   and Harvey B. Jackson*
                    Attorneys Patented Oct. 19, 1954

2,691,926

UNITED STATES PATENT OFFICE 2,691,926

COTTON CHOPPER

Jasper Jackson, Dumas, Ark., assignor of one-half to James P. Ragsdale, Jr.

Application March 12, 1951, Serial No. 215,071

3 Claims. (Cl. 97—15)

This invention relates to improvements in agricultural equipment.

An object of this invention is to provide a cotton chopper of improved structural form which is adapted to be used on a small tractor of standard make and which includes an upper support frame to which the lower work assembly is resiliently attached.

Ancillary objects and features of importance will become apparent in following the description of the illustrated form of the invention.

In the drawings:

Figure 3 is an enlarged longitudinal sectional view of one of the devices;

Figure 4 is a transverse sectional view taken substantially on the line 4—4 of Figure 3;

Figure 5 is a transverse sectional view taken substantially on the line 5—5 of Figure 3;

Figure 6 is a perspective view of one of the adjustable skids constituting a part of the device;

Figure 7 is an enlarged fragmentary sectional view showing the fastening of the lower end of one of the rods used in the device to one of the yokes; and Figure 8 is a fragmentary sectional view of the upper end arrangement of the same rod.

Figure 1:
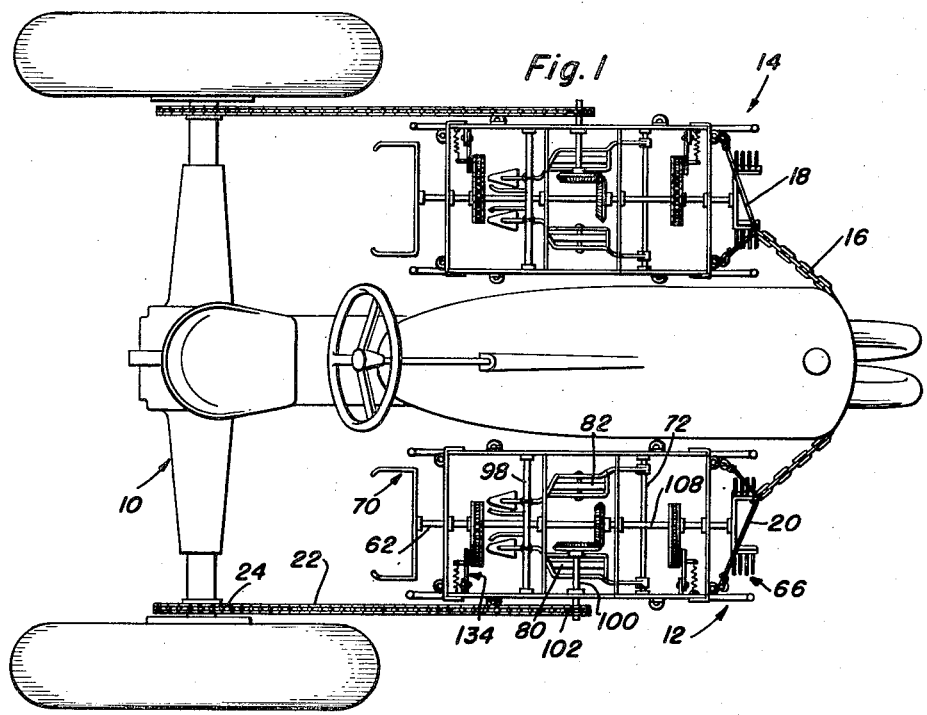
Figure 1 is a plan view of a standard small tractor having two units of the instant invention mounted thereon.
Figure 2:
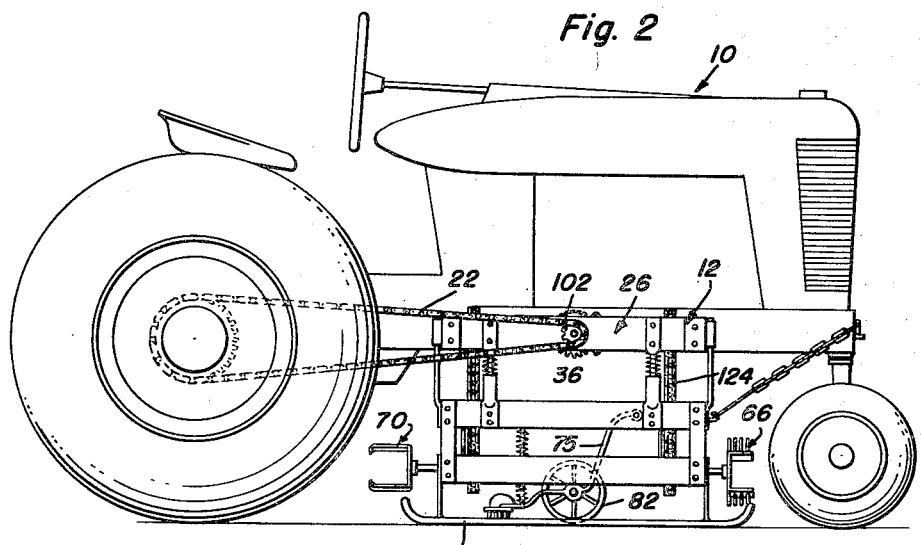
Figure 2 is a side view of the structure in Figure 1.

The illustrated device is adapted to be attached to a standard tractor 10 and actuated by power taken from the tractor. As noted in Figure 1, there is a unit or assembly 12 and an identical unit or assembly 14, the units being connected together by the flexible connecting member or chain 16 which is fastened to the tow ropes 18 and 20 at the forward ends of the units. The flexible member 16 extends around the front of the tractor 10 and may be fastened thereto by standard means.

Each unit is identical in construction and may be operated by any standard means or by means of a chain 22 which is enmeshed with a sprocket 24, the sprocket being fastened to one of the wheels of the tractor.

Attention is now invited to Figures 3-5 where there is illustrated an upper rectangular frame 26 which has a pair of front sleeves 28 attached to it and a pair of rear sleeves 30 also attached to it. The sleeves serve as guides for the two front rods 32 and the two rear rods 34, the rods 32 and 34 being fastened to a lower frame 36. The lower frame is provided with any practical number, but preferably four, upwardly opening tubes 38 in which the rods 40 are vertically slidable. These rods are fastened to the upper frame 26 and have springs 42 concentrically arranged therewith. The springs bear against the upper frame 26 and the upper ends of the tubes 38 thereby constantly yieldingly spreading the lower frame with respect to the upper frame. In view of the presence of the rods 32 and 34 and their sliding relationship with the tubes 28 and 30, the lower frame is yieldingly connected with the upper frame 26 and arranged to move upwardly and downwardly as the device is moved through a field.

The lower frame 36 includes an upper rectangular frame member 38 to which the rods 32 and 34 are attached and a lower rectangular frame member 46 held spaced from the upper frame member 44 by means of vertical supports 48 which are bolted or otherwise rigidly fastened in place. Two skids 50 and 52, respectively, are attached to the lower frame member 46 of the lower frame 36 by means of the vertical supports 54, there being one provided near each end of each skid and each vertical support 54 is provided with a plurality of apertures 56, through which fastening bolts 58 pass so as to adjustably attach the skids to the lower frame 36 when the bolts 58 are fastened to part of the lower frame. In order that the tow lines 18 and 20 may be easily attached and detached, the hooks 60 which are fastened to the lower frame 36 may be employed.

A rotating tool bar 62 is mounted in bearings 63 and 64, which are fastened to the lower frame member 46. This tool bar has a chopper tool 66 at its front end in advance of the lower frame. The chopper tool comprises a substantially U-shaped member 67 which has a boss 68 intermediate its ends and which has a plurality of tines 69 on the legs thereof. The boss is fastened to the outer end of the rotating tool bar 62 by means of a set screw or other standard fastening device. The function of the tool 66 is to thin rows of cotton when the device is pulled through a cotton field. There is a hoe 70 detachably secured to the rear end of the tool bar 62, whereby upon rotation of the tool bar, not only is the chopper tool 63 operated but also the hoe 70.

A transverse spindle 72 extends across the sides of the upper frame member 44 of the lower frame 36 and is held in place by being mounted in standard bearings 73. This spindle has two yokes 75 and 76 fastened thereto by the bosses 78 and 79 at the upper ends thereof. Intermediate the upper and lower ends of each yoke there is a wheel 80 and 82 mounted for rotation and adapted for ground engagement. At the extreme ends of the yokes 75 and 76, there are scraper tools 84 and 86 for ground working and soil and foliage deflector baffles 90 and 92 are fastened to a top part of the earth working tools 84 and 86.

Inasmuch as the spindle 72 is mounted for rotation, there is a resilient restraining means for the yokes. At the ends of the yokes near the earth working tools 84 and 86 there are rod assemblies. The rod 94 is pivoted by means of the pin 95 to the yoke 75 and is located in a slot 96 formed in the yoke 75. Accordingly, the rod 94 is capable of being pivoted with respect to the yoke 75. A spring 97 is arranged concentrically with the rod 94 and seated upon the yoke. It also bears against a transverse spindle 98 which is carried by the upper frame member 44 of the lower frame 36. Therefore, when the wheel 80 is lifted with respect to the skid mounted unit, the lifting thereof is opposed yieldingly by the spring 97. Conversely, the spring 97 constantly presses the yoke 75 downwardly whereby the wheel 80 acts as a depth gauge for the earth working tool 84.

As stated previously, the power for operating the tool bar 62 is derived from the tractor, for example, from the chain 22 which is enmeshed with the sprocket 24. A transverse shaft 100 is carried by the upper frame 26 and has a sprocket 102 at one end engaged with the chain 22, so that when the chain 22 is operated, the transverse shaft 100 is rotated. Beveled gear 104 is fixed to the shaft 100 and is enmeshed with the beveled gear 106, carried by the removable longitudinal shaft 108. This longitudinal shaft 108 is mounted in bearings 109 and 110 which are carried by the ends of the upper frame 26. Thrust bearings 111 and 112 are fastened by set screws on the longitudinal shaft 108 and are arranged to contact the transverse partitions 114 and 116 of the upper frame 26 to thereby limit the extent of axial movement of the longitudinal shaft 108. By loosening the set screws of the thrust bearings 111 and 112, the longitudinal shaft 108 may be slid through openings provided in the ends of the upper frame 26 in alignment with the bearings 109 and 110.

Sprockets 120 and 122 are removably fastened, by standard means, to the shaft 108 and have chains 124 and 126 respectively extending therearound, the chains 124 and 126 also extending around sprockets 128 and 130 which are fastened to the rotating tool bar 62. By virtue of the described drive structure, actuation of the chain 22 causes rotation of the tool bar 62. Since the lower frame 36 is capable of floating with respect to the upper frame, due to the previously described resilient mounting means, a tightener assembly 134 for each chain 124 and 126 is provided. The tightener assembly for the chain 126 is identical to the assembly for the chain 124. It includes an arm 136 which is pivoted by means of a standard bracket 138, to the lower member or element 46 of the lower frame 36. A spring 140 or other suitable yielding element is fastened at one end to the arm 136 and at the other end to the upper frame member 44 of the lower frame 36. There is an idler sprocket 144 mounted at the outer end of the arm 136 and enmeshed with the chain 126. Accordingly, when the lower frame 36 is moved vertically with respect to the upper frame 26, the arm 134 is pivoted by the action of the spring 140, thereby tightening the effective length of the chain 126. However, when the frames are moved in the opposite direction, vertically, with respect to each other the spring 140 is pulled due to the tightening of the chain 126 to supply ample chain length.

In operation, the device is drawn through a cotton field by a tractor. It is preferable that one unit be mounted on each side of the tractor. As the wheels of the tractor move, the tool bar 62 of each unit is rotated through the gearing entrained drive. The initial chopping takes place through the action of the chopper 66 which rotates slowly and in response to movement of the actual tractor. For each unit of distance traveled by the tractor, one small area of cotton plants is removed. At the same time, the hoe 70 is used for earth working, as are the scrapers 84; however, these scrapers are mounted yieldingly.

Having described the invention, what is claimed as new is:

1. A cotton chopper attachment for tractors comprising an upper frame and a lower frame spaced therefrom, resilient means connecting said frames to one another for vertical displacement in parallel planes with respect to one another, a rigid shaft mounted for rotation on said lower frame and having its ends extending exteriorly of opposite ends of said frame, a rotatable rake and a rotatable hoe fixed secured to the ends of said shaft and means for rotating said shaft carried by said upper frame, and skids attached to said lower frame to space the tool bar from the soil, said upper and lower frames being rectangular, said upper frame including a rotatable stub shaft operatively connected to a tractor, a bevel gear on said stub shaft, said means for rotating said shaft comprising a longitudinally extending shaft rotatably mounted on said upper frame and extending parallel to said first mentioned shaft, said longitudinally extending shaft having a bevel gear fixedly secured thereto and meshing with said stub shaft gear, chain and sprocket means interconnecting said longitudinally extending shaft and said first mentioned shaft.

2. The combination of claim 1 wherein said chain and sprocket means are connected adjacent each end of said longitudinally extending shaft and said first mentioned shaft.

3. A cotton chopper attachment for tractors comprising an upper frame and a lower frame spaced therefrom, resilient means connecting said frames to one another for vertical displacement in parallel planes with respect to one another, a rigid shaft mounted for rotation on said lower frame and having its ends extending exteriorly of opposite ends of said frame, a rotatable rake and a rotatable hoe fixedly secured to the ends of said shaft, and means for rotating said shaft carried by said upper frame, and skids attached to said lower frame to space the tool bar from the soil, said upper frame including a rotatable stub shaft operatively connected to a tractor, gear means on said stub shaft, said means for rotating said first mentioned shaft comprising a longitudinally extending shaft rotatably mounted on said upper frame and extending parallel to said first mentioned shaft, said longitudinally extending shaft having a gear fixedly secured thereto and meshing with said stub shaft gear, chain and sprocket means interconnecting said longitudinally extending shaft and said first mentioned shaft.

References Cited in the file of this patent

UNITED STATES PATENTS

| Number | Name | Date |
|---|---|---|
| 865,540 | Stockton | Sept. 10, 1907 |
| 872,787 | Bell | Dec. 3, 1907 |
| 1,113,722 | Weatherly | Oct. 13, 1914 |
| 1,132,480 | Long | Mar. 16, 1915 |
| 1,518,287 | Whitaker | Dec. 9, 1924 |
| 1,565,694 | Weaver | Dec. 15, 1925 |
| 1,718,818 | Hanson | June 25, 1929 |
| 1,779,834 | Uddenborg | Oct. 28, 1930 |
| 1,896,011 | Perry | Jan. 31, 1933 |
| 2,414,507 | Callahan | Jan. 21, 1947 |
| 2,514,405 | Marihart | July 11, 1950 |